Figure 1:
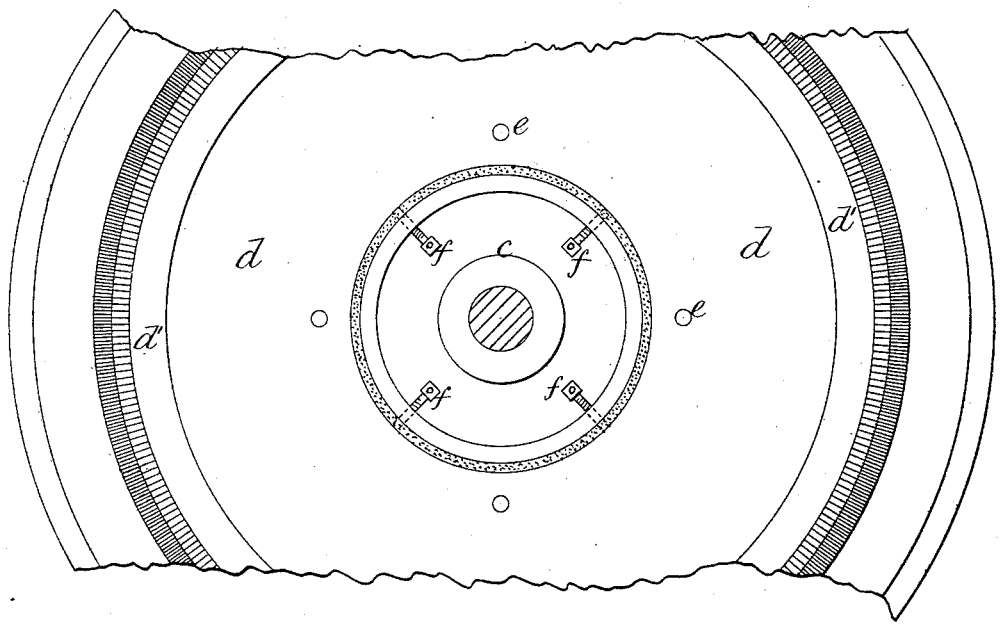

(No Model.) 2 Sheets—Sheet 1.

F. W. GARDAM.
SECURING THE PARTS OF TRANSITS AND OTHER INSTRUMENTS OF PRECISION.

No. 325,070. Patented Aug. 25, 1885.

Witnesses
H. D. Williams
E. J. Baker

Frederick W. Gardam
Inventor.
per Alfred Thedlock
atty.

(No Model.) 2 Sheets—Sheet 2.

F. W. GARDAM.

SECURING THE PARTS OF TRANSITS AND OTHER INSTRUMENTS OF PRECISION.

No. 325,070. Patented Aug. 25, 1885.

Witnesses.
H. D. Williams
E. J. Baker

Frederick W. Gardam
Inventor.
per Alfred Shedlock
Atty.

United States Patent Office.

FREDERICK W. GARDAM, OF BROOKLYN, NEW YORK, ASSIGNOR OF TWO-THIRDS TO WILLIAM GARDAM AND JOSEPH GARDAM, OF SAME PLACE.

SECURING THE PARTS OF TRANSITS AND OTHER INSTRUMENTS OF PRECISION.

SPECIFICATION forming part of Letters Patent No. 325,070, dated August 25, 1885.

Application filed April 29, 1882. (No model.)

*To all whom it may concern:*

Be it known that I, FREDERICK W. GARDAM, of Brooklyn, county of Kings, State of New York, have invented certain new and useful Improvements in Transits and other Instruments of Precision, of which the following is a specification.

In surveying-instruments and other instruments of precision it is necessary that some of the parts, to facilitate the manufacture of the same, be made separate and then fastened together after being carefully adjusted. Screws are generally used for this purpose. It is found that sudden shocks will often disturb the adjustment of the instrument, even when dowel-pins are used as an extra security to hold the parts together, and I find it almost impossible to fit dowel-pins in certain instruments after the adjustment of the same with sufficient nicety not to disturb such adjustment. Particularly is trouble had in surveyors' transits with the connection between the lower limb on which the graduations are marked and the center socket forming the central bearing on which the graduated scale is rotated in relation to the verniers secured to the upper limb or plate, as a sudden shock or jar will often disturb the lower limb or plate sufficiently to cause serious errors in reading from the scale, although such disturbance of the scale-limb may be almost imperceptible.

To obviate this trouble by a simple means for readily and firmly securing the lower or scale limb to the central socket, and securing the separate parts of instruments of precision together is the object of this invention, and this I accomplish in surveyors' transits as follows: On the lower limb and central socket flanges are formed, leaving an annular recess between them, in which, after the parts are properly adjusted, I place a suitable plastic material, which, when set, is sufficiently hard to withstand any shock the instrument may be subjected to without being in the least disturbed. This annular recess I prefer to place on the upper side of the lower limb, so that the plastic material placed therein will be entirely covered up, and also to make said recess undercut in such a manner that the plastic material cannot fall out nor the parts connected thereby be separated until it be intentionally removed.

As an extra security to the annular filled recess I propose in some cases to form holes in the lower limb and socket and place therein the plastic material, thereby making dowel-pins which adapt themselves perfectly to their holes; or in some cases these plastic material dowel-pins may be used without the plastic material placed in the annular recess. I also secure the verniers to the upper or vernier limb by placing the plastic material between their outer edges and flange of the limb, and, further, by nicking said parts so that the verniers cannot move sidewise. The dowel-pins of plastic material may also be applied to the verniers, if desired.

Any suitable plastic material, or a fusible metal or alloy which sets without shrinkage, may be used to fill the annular recess or holes; but I find in practice that plaster-of-paris answers the purpose well, as the same is easily applied, sets readily and without shrinkage, and is sufficiently hard to make separate pieces of metal connected together, as described, virtually as one piece.

To describe my invention more particularly, I will now refer to the accompanying drawings, forming part of this specification, which illustrate in various forms the application of my invention to transit instruments.

Figure 2:
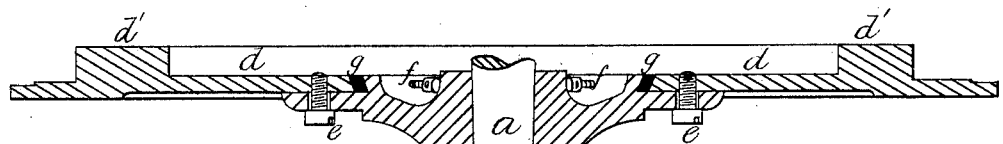
Figure 3:
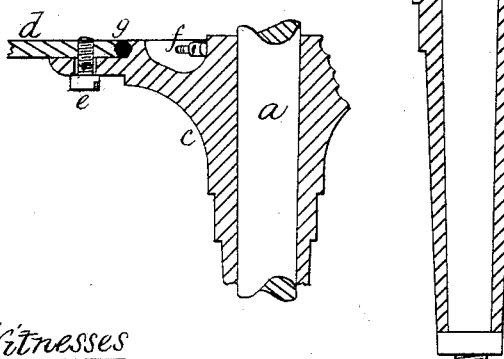
Figure 4:
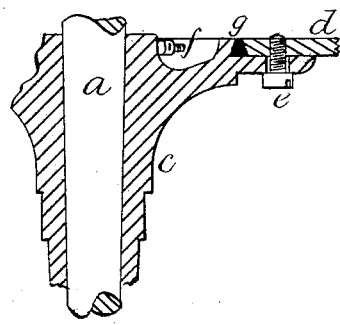
Figure 5:
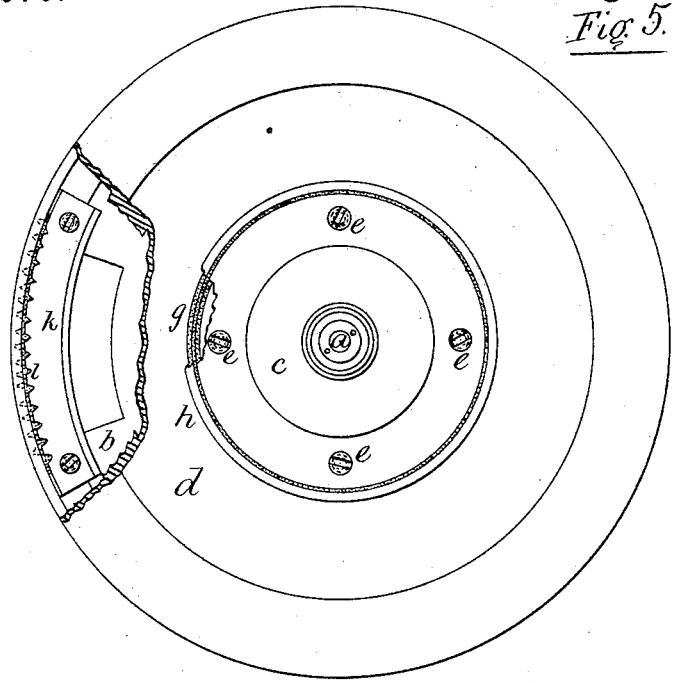
Figure 6:
Figure 9:
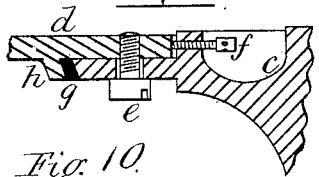
Figure 8:
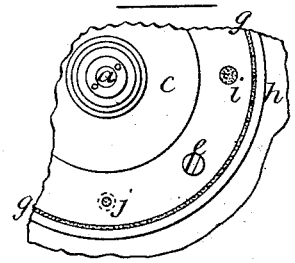
Figure 10:
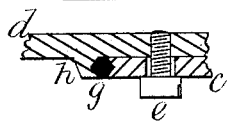
Figure 7:
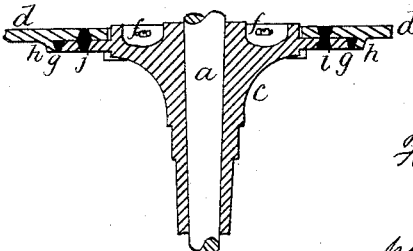

Figure 1, Sheet 1, is a plan view of the lower limb of a transit partly broken away, showing the plastic connecting material applied in an annular recess on the upper side thereof. Fig. 2, Sheet 1, is a vertical section of the same. Fig. 3, Sheet 1, is a part section showing a modification in the form of the annular recess. Fig. 4, Sheet 1, is another modification. Fig. 5, Sheet 2, is an under side view of a transit lower limb or plate and socket, showing the plastic material placed in an annular recess on the under side thereof, also showing the verniers. Fig. 6, Sheet 2, is a central vertical section of the same. Fig. 7, Sheet 2, is a part vertical section showing the application of the plastic material as dowel-pins. Fig. 8, Sheet 2, is an underside view of the same. Fig. 9, Sheet 2, is an enlarged part vertical section showing a modification in the form of the recess, and Fig. 10, Sheet 2, is another modification.

I have only shown in the drawings such parts of a transit instrument as are necessary to a full understanding of the application thereto of my invention, the connection of the same with the other working parts of the instrument being readily understood by those skilled in the art to which the invention appertains.

$a$ represents the spindle of the instrument, secured to the upper limb or vernier-plate, $b$. (See Fig. 6.) This upper limb is not shown in the views on Sheet 1, said views illustrating only a method of securing the lower limb to the socket, which method I propose to adopt in practice. The socket $c$ is secured to the lower limb, $d$, having the scale $d'$ marked thereon, by means of the screws $e\ e$, and is adjusted so as to be concentric therewith by means of the adjusting-screws $f\ f$, as ordinarily. The annular space between the flange of the socket $c$ through which the adjusting-screws $f\ f$ pass and the inner edge of the lower limb, $d$, against which the adjusting-screws butt I form as shown in Fig. 2, and after said parts are carefully adjusted in relation to one another, I fill the annular space with plaster-of-paris $g$ or other plastic material, which, when set, firmly holds the said parts together concentrically and prevents their separation in line with the axis by the undercutting of the flange of the socket, so that should the screws $e\ e$ become loose the adjustment is not lost. The adjusting-screws may be left in their places or removed after the plastic material is set, as desired.

Fig. 3 shows a modification in the form of the annular recess in which both the socket $c$ and lower limb, $d$, are undercut. In both of these forms of annular recess it will be necessary to remove the plastic material before the parts can be separated, which separation of these parts, when once properly adjusted, is very seldom required; but should it be desirable to apply the plastic material so that the parts may be separated without destroying the plastic material then the annular recess may have straight vertical sides or inclined straight sides, as shown at Fig. 4.

The advantage of filling the annular recess on the upper part of the lower limb and socket is because the filling will be entirely covered up by the upper limb or vernier-plate, $b$.

Figs. 5 to 10 illustrate the plastic material $g$ applied in annular recesses of different forms, formed by flange $h$ on the under side of the lower limb, $d$, and the edge of the flange on the socket $c$. Figs. 7 and 8 also illustrate the manner in which I propose to apply the plastic material as dowel-pins, $i$ showing the same placed in a hole countersunk from the outer ends, thereby acting as a rivet to hold the socket $c$ and lower limb together, and $j$ showing it placed in a hole enlarged at the central part, which, retaining the two parts of the instrument together concentrically, permits of their separation without destroying the dowel-pins. Either of these forms may be employed according to whether the parts connected together require to be permanently attached or separable.

The manner adopted by me to secure the verniers $k\ k$ to the upper limb, $b$, is illustrated in Figs. 5 and 6, Fig. 5 being an under view of Fig. 6, partly broken away to show the vernier attachment. A small space is left between the vernier $k$ and flange $b'$ of the upper limb, $b$, said flange $b'$ and edges of the verniers being niched, as shown at Fig. 5. After the verniers are properly adjusted on the upper limb the plastic material $l$ is placed between the edges of the verniers and flange $b'$, filling up the spaces between them and also the niches, thereby holding the verniers firmly in position. If desired, the verniers and upper limb may be further secured together by means of dowel-pins of plastic material, as shown in Figs. 7 and 8.

Although I have only shown the application of my new method of securing together and holding separate pieces of metals in adjustment to transit instruments, it is obvious that the same may with great advantage be applied to any instrument of precision composed of separate pieces of metal or other hard material which require to be firmly held together when once properly adjusted.

What I claim, and desire to secure by Letters Patent, is—

1. The combination, with a socket and lower limb of a transit, of a plastic material arranged in an annular recess formed between adjacent parts of the same, substantially as and for the purpose hereinbefore set forth.

2. The combination, with the upper limb, $b$, and verniers $k\ k$, formed and arranged, as described, with annular recesses between them, of the plastic material holding and retention device $l$, substantially as and for the purpose set forth.

3. As an improved means for holding the socket $c$ and lower limb, $d$, of a transit instrument in adjustment, the combination therewith of the plastic material $g$, placed in the annular recess having undercut sides formed by the inner edge of the lower limb and the flange of the socket through which the adjusting-screws $f\ f$ pass, substantially as and for the purpose set forth.

In testimony whereof I have hereunto set my hand at New York, county and State of New York, this 27th day of April, A. D. 1882.

FREDERICK W. GARDAM.

Witnesses:
H. D. WILLIAMS,
E. G. BAKER.